United States Patent [19]

Josten et al.

[11] Patent Number: 5,574,902
[45] Date of Patent: Nov. 12, 1996

[54] EFFICIENT DESTAGING OF UPDATED LOCAL CACHE PAGES FOR A TRANSACTION IN A MULTISYSTEM AND MULTIPROCESS DATABASE MANAGEMENT SYSTEM WITH A HIGH-SPEED SHARED ELECTRONIC STORE

[75] Inventors: Jeffrey W. Josten, Morgan Hill; Tina Mukai, San Jose; Inderpal S. Narang, Saratoga; James Z. Teng, San Jose, all of Calif.

[73] Assignee: International Business Machines Corporation, Armonk, N.Y.

[21] Appl. No.: 236,284

[22] Filed: May 2, 1994

[51] Int. Cl.⁶ .................................................. G06F 13/14
[52] U.S. Cl. ................................ 395/601; 395/561
[58] Field of Search .................................. 395/471, 472, 395/457, 458, 650, 700, 600; 364/228.1

[56] References Cited

U.S. PATENT DOCUMENTS

| | | | |
|---|---|---|---|
| 5,043,866 | 8/1991 | Myre, Jr. et al. | 364/200 |
| 5,247,672 | 9/1993 | Mohan | 395/650 |
| 5,276,835 | 1/1994 | Mohan et al. | 395/425 |
| 5,280,611 | 1/1994 | Mohan et al. | 395/600 |
| 5,287,473 | 2/1994 | Mohan et al. | 395/425 |
| 5,317,739 | 5/1994 | Elko et al. | 395/650 |
| 5,333,303 | 7/1994 | Mohan | 395/575 |
| 5,408,653 | 4/1995 | Josten et al. | 395/600 |
| 5,455,942 | 10/1995 | Mohan et al. | 395/600 |
| 5,537,574 | 7/1996 | Elko et al. | 395/468 |

OTHER PUBLICATIONS

C. Mohan, "ARIES: A Transaction Recovery Method Supporting Fine–Granularity Locking and Partial Rollbacks Using Write–Ahead Logging", Research Report RJ 6649, Rev. Nov. 2, 1990, International Business Machines Corporation.

C. Mohan & I. Narang, "Recovery and Coherency–Control Protocols for Fast Intersystem Page Transfer and Fine–Granularity Locking in a Shared Disks Transaction Environment", Research Report RJ 8017, Mar. 15, 1991, International Business Machines Corp.

Primary Examiner—Tod R. Swann
Assistant Examiner—Conley B. King, Jr.
Attorney, Agent, or Firm—Baker, Maxham, Jester & Meador

[57] ABSTRACT

An efficient procedure for determining the set of buffer pool database pages that must be externalized to stable storage and for scheduling their write I/O's before release of a committing transaction's locks. In a multisystem database management system (DBMS) with high-speed shared external storage (SES) environment, a DBMS instance may follow "force-at-commit" protocol for a database that has intersystem read/write interest or may alternatively follow a "no-force-at-commit" policy when operating with a database for which only one system has interest. By introducing the concept of a series of unique ordinal numbers (ORD#) for each database assigned to buffer pool data pages whenever the page state changes from clean to dirty within a single DBMS instance, this procedure maintains a transaction page list (TPL) for each transaction in ORD# order. Because the dirty page list (DPL) pages are queued in ORD# sequence and each TPL includes all modified pages associated with the transaction, a merge scan with DPL entries can be performed for each TPL at the commit time of the corresponding transaction. This searches the DPL in a single pass with minimal DPL latch contention. The TPL pages requiring destaging are distributed to two processing lists; a first list for immediate force to SES and a second list of "in-use" pages that are forced to SES if necessary upon release of existing process latches.

12 Claims, 5 Drawing Sheets

EFFICIENT DESTAGING OF UPDATED LOCAL CACHE PAGES FOR A TRANSACTION IN A MULTISYSTEM AND MULTIPROCESS DATABASE MANAGEMENT SYSTEM WITH A HIGH-SPEED SHARED ELECTRONIC STORE

CROSS REFERENCE TO RELATED APPLICATION

This application is related by common inventorship and subject matter to copending patent application Ser. No. 08/236,798, entitled PAGE REFRESHING PROCEDURE USING TWO LOCKING GRANULARITIES TO ENSURE CACHE COHERENCY IN A MULTISYSTEM DATABASE PROCESSING ENVIRONMENT HAVING A HIGH-SPEED SHARED ELECTRONIC STORE filed on even date herewith, assigned to the Assignee hereof and entirely incorporated herein by this reference.

BACKGROUND OF THE INVENTION

1. Field of the Invention

This invention relates generally to concurrent multiuser database processing systems coupled to a shared external database store and particularly to an efficient "force-at-commit" destaging procedure for maintaining data consistency in a multisystem DBMS shared disk environment.

2. Description of the Related Art

Many modern Data Base Management Systems (DBMSs) follow a "no-force-at-commit" policy in a single multiuser database processing system environment to reduce the overhead of database transfers from cache memory to stable external storage. This can be accomplished by asynchronous destaging in batch mode rather than forcing local cache pages to disk at each transaction commit. However, preservation of data consistency among multiple DBMS instances where each database relies on simple recovery techniques in a multisystem environment requires each DBMS to follow a "force-at-commit" protocol whenever updating a database that experiences intersystem read/write interest. Force-at-commit policy in a multisystem shared disk environment herein implies that all data pages updated by a transaction are first written to the shared external (stable) store and then invalidated in every other concurrent multiuser system exhibiting interest before release of transaction locks. The extended persistence of transaction locks in these circumstances strongly reduces system efficiency.

The method of this invention is practiced in the multisystem environment described in copending patent application Ser. No. 07/860,805 filed on Mar. 30, 1992, by D. Elko et al., now U.S. Pat. No. 5,537,574, as "Sysplex Shared Data Coherency Method", (Assignee Docket PO9-91-052), assigned to the Assignee hereof and entirely incorporated herein by this reference. Elko et al. describe a Shared Electronic Storage (SES) facility, which includes a reliable nonvolatile electronic store that can be coupled to multiple systems for sharing data. The combination of a SES and a shared disk store is herein denominated an External Storage System (ESS). A DBMS instance can perform fast-writes of modified data pages to the SES under a "force-commit" protocol for later destaging to disk without waiting on disk actuator latency.

Such a procedure, employed to reduce the overheads of global locking, is described in U.S. patent application No. 07/869,267 filed on Apr. 15, 1992 by Josten et al. as "Efficient Data Base Access Using a Shared Electronic Store in a Multi-system Environment With Shared Disks", now U.S. Pat. No. 5,408,653, commonly assigned to the Assignee hereof and entirely incorporated herein by this reference. Josten et al. describe a protocol whereby, with no intersystem interest in a database, a DBMS follows a "no-force-at-commit" policy permitting it to write database updates to external storage asynchronously ("batch" mode) to transaction commit processing. This improves transaction response time and reduces the global lock hold time for better concurrency. Alternatively, when a buffer manager (BM) detects intersystem interest in a database, a "force-at-commit" policy is used to maintain coherency. This force-at-commit policy requires the DBMS, before releasing locks on data pages that are updated by a committing transaction, to ensure that the data pages are written to external storage and that all other "interested" systems are notified of the changed pages. The alternate force-at-commit protocol reduces forcing overhead substantially by initially externalizing these "dirty" data pages to SES, to be written to disk in a separate process, thereby compensating somewhat for the increased commit overhead required to maintain coherency with intersystem interest.

A typical transaction recovery protocol suitable for such a multisystem DBMS shared disk environment can be appreciated with reference to "ARIES: A Transaction Recovery Method Supporting Fine-Granularity Locking and Partial Rollbacks Using Write-Ahead Logging", C. Mohan et al., Research Report RJ-6649, Revised Nov. 2, 1990, International Business Machines Corporation, which is entirely incorporated herein by this reference. To meet transaction and data recovery guarantees, the "write-ahead" logging (WAL) recovery system records in a log the progress of a transaction and all of its actions that cause changes to recoverable data objects. The recovery log becomes the source for ensuring either that the transaction's committed actions are reflected in the (stable) database despite various types of failures or that its uncommitted actions are undone (rolled back). When the logged actions reflect data object content, then these log records also become the source for reconstruction of damaged or lost data. Conceptually, the log can be thought of as an ever-growing sequential file, the nonvolatile version of which is stored in "stable storage", usually in disk systems. As used herein, stable storage means nonvolatile storage that remains intact and available across system failures and includes various combinations of disk and nonvolatile store (NVS) cache memory.

Whenever recovery log records are written, they are first placed in "volatile" storage, which usually denominates cache memory. Only at certain times (such as at transaction commit time) are the recovery log records up to a certain point written in log page sequence to stable storage. This is herein denominated "forcing" the recovery log up to the certain point. The WAL protocol requires recovery log records representing changes to selected data pages to be in stable storage before the changed data pages in local cache memory are allowed to replace the previous data page versions in stable storage. That is, the system is not permitted to write an updated page to external storage until at least the "undo" portions of the recovery log records describing the page updates have been first written to stable storage. Transaction status is also stored in the recovery log and no transaction can be considered complete until its committed status and all of its log data are safely recorded in external stable storage by "forcing" the recovery log up to the transaction's commit log record serial number. This requirement permits a restart recovery procedure to recover any transactions that complete successfully but whose updated pages are not physically written to external storage before system failure. Such feature implies that a transaction is not allowed to complete its "commit" processing until all recovery log records for that transaction are safely in stable storage.

Multiple concurrent DBMS instances using the shared disk (data-sharing) architecture is one approach to improving capacity and availability over a single DBMS instance. In a shared disk environment, all the disks containing the database are shared among the different DBMS instances (or systems). Every system may read and modify any portion of the database on the shared disks. Because each DBMS instance has its own buffer pool and because conflicting accesses to the same data can arise simultaneously from different systems, special synchronization protocols are required to govern intersystem interactions. These protocols require global locking facilities and procedures for maintaining coherency in the local cache buffers (LCBs) in the different systems.

A transaction system, such as International Business Machine Corporation's DB2 system, that does not write an updated page to disk at transaction commit has the current version of a page in its buffer pool. In a shared disk environment, each sharing DBMS instance has its own buffer pool. Thus, when a system requests a page whose current version is cached in another system (denominated the owner), the owner system must provide the page to the requester. Various techniques for meeting such requests without long delays are disclosed by C. Mohan et al. in a paper entitled "Recovery and Coherency-Control Protocols for Fast Intersystem Page Transfer and Fine-Granularity Locking in a Shared Disks Transaction Environment", Research Report RJ 8017, Mar. 15, 1991, International Business Machines Corporation. However, Mohan et al. require each page to be written to disk for simple recovery purposes because no SES capability is assumed.

Reference is also made to U.S. patent application No. 07/955,076 filed on Oct. 1, 1992 by C. Mohan et al., now U.S. Pat. No. 5,455,942, assigned to the Assignee hereof, and entirely incorporated herein by this reference. Reference is made to issued U.S. Pat. Nos. 5,276,835, 5,280,611, and 5,287,473 issued to C. Mohan et al. and commonly assigned to the Assignee hereof, all fully incorporated herein by this reference.

Because the system disclosed in the above-cited Josten et al. patent application employs two distinct commit forcing protocols, there is a clearly-felt need for an efficient method for determining the pages modified by a transaction, for scheduling and performing their destaging writes to external storage, and for cross-invalidating their cached copies in any other systems showing "interest". Such "dirty-page" identification and scheduling procedures are necessary because protocol selection in the Josten et al. sysplex occurs dynamically between "force" and "no-force" strategies in response to unpredictable "interest" in the subject database by other systems. The "force" protocol requires transaction level tracking of dirty pages, although the "no-force" protocol does not.

Because commit processing occurs very frequently in a high transaction rate environment and because "force-at-commit" policies may govern selection and scheduling of buffer pool pages to external stable storage, there is a clearly-felt need for an efficient method for processing a transaction's updated pages for externalization in a multi-system DBMS with shared external storage environment. The related unresolved problems and deficiencies are clearly felt in the art and are solved by this invention in the manner described below.

SUMMARY OF THE INVENTION

This invention introduces an efficient procedure for determining and scheduling the I/O's for those cached database pages that must be written to shared stable storage and cross-invalidated in other concurrent systems when a transaction commits in a multisystem shared disk environment. This invention includes (a) an efficient process for identifying the set of local cache buffer (LCB) database pages that must be externalized and (b) a fast process for scheduling of their externalizing write I/O's so that the corresponding transaction can release its locks. In a multi-user environment within a single DBMS instance, when a transaction attempts to schedule a write I/O for a local cache buffer page, other transactions may introduce delays by operating on the same page. For example, another transaction may be updating the page, or the page may be already in the process of being externalized to disk. This invention considers such conditions and adapts the externalization procedure to reduce the overall time for "force-at-commit" processing.

This invention accomplishes these improvements by introducing several important new concepts. First, the DPL, which is maintained separately for each database within each DBMS instance, is exploited to determine whether a data page must be externalized or not, thereby avoiding the need for an expensive buffer pool search. Secondly, this invention introduces the concept of a unique and monotonically increasing ordinal-number (ORD#) that is maintained for each database within each DBMS instance to permit efficient identification of LCB data pages within the DPL. The unique ORD# is maintained in the buffer control block (BCB) for a LCB page when the page state changes from clean to dirty. As used herein, "dirty" denominates a page in which at least one record was updated by a transaction in LCB that is not yet written to external stable storage. Finally, a Transaction Page List (TPL) is maintained for each transaction by accumulating the ORD# for each page modified by the transaction.

It is an object of the method of this invention to improve the speed of identification of local buffer pages that must be externalized at the commit of a transaction. It is a feature of the method of this invention that the DPL and TPL are merged and scanned in ORD# sequence to identify such pages in a single TPL pass. It is an advantage of this invention that the DPL requires no Least Recently Used (LRU) ordering, thereby eliminating related computation overhead. It is another advantage of this invention that the single-pass TPL search reduces latch contention in the DPL because the DPL latch is not held during I/O's to external storage nor during possible waits for completion of interfering operations by other transactions on the LCB data page.

It is another object of this invention to delay the scheduling of page I/O until existing interfering locks are removed. It is a feature of this invention that the pages identified for externalization are separated into two groups, one for immediate I/O and the other for delayed scheduling to permit completion of existing interfering processing. It is an advantage of this invention that dual-pass externalizing minimizes the effects of interfering activity on destaging time.

It is yet another object of this invention to minimize the transaction page information that must be tracked in the TPL. It is an advantage of the method of this invention that tracking only the ORD# in the TPL minimizes DBMS memory requirements. It is a feature of this invention that only the ORD# is tracked for each updated page in a specific database and repeated updates to the same data page by the same transaction do not create additional TPL entries unless the data page is "externalized and cleaned" between such updates.

The foregoing, together with other objects, features and advantages of this invention, will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

The Multisystem Sysplex Environment

Figure 1:
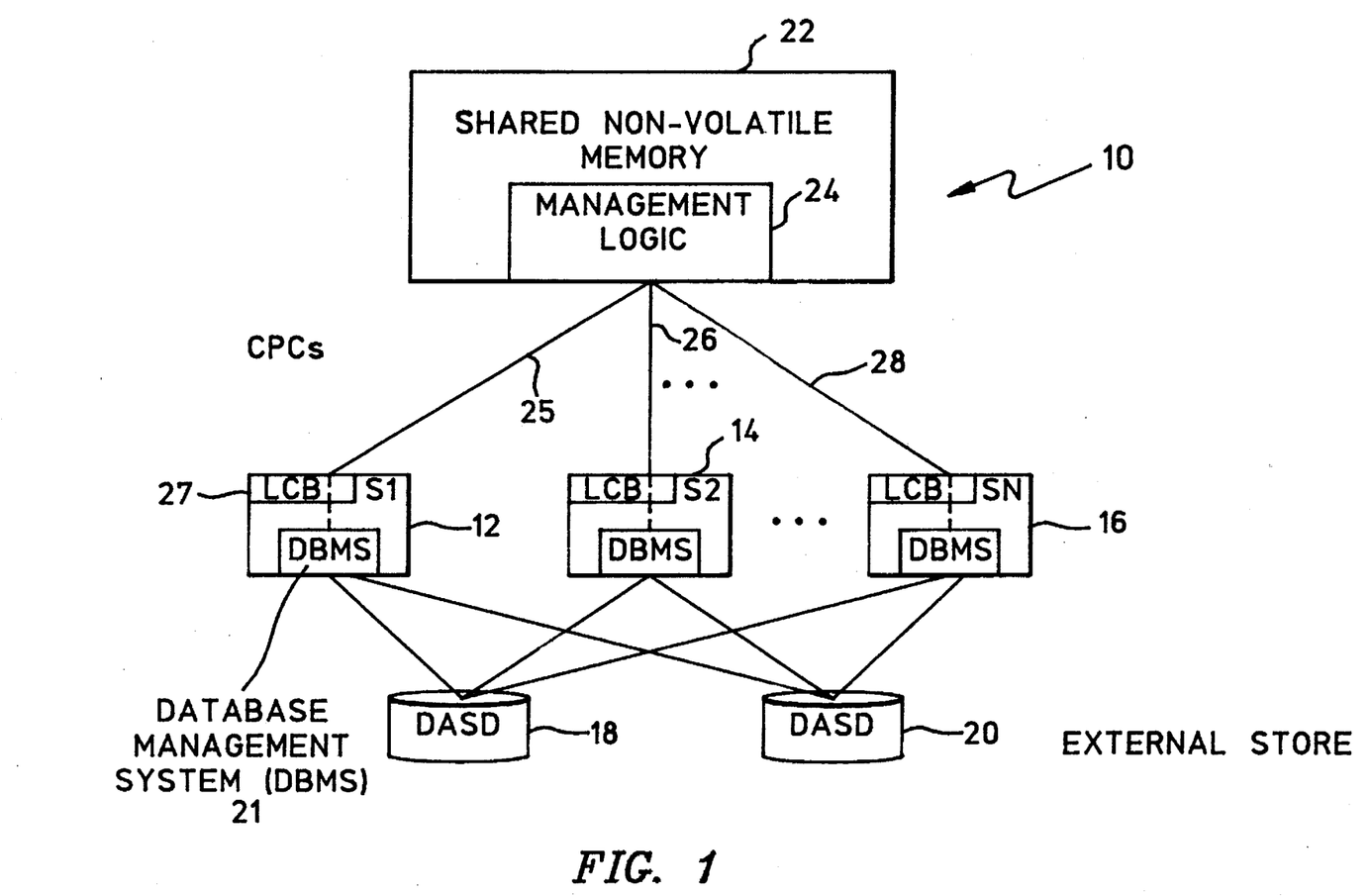
FIG. 1 is a functional block diagram of a multisystem DBMS shared disk environment suitable for the practice of the method of this invention.

FIG. 1 shows the typical multisystem environment suitable for implementation of the procedure of this invention. A multisystem data sharing complex (sysplex) 10 is shown having a plurality of independently-operating computer processing complexes (CPCs) exemplified by CPCs 12, 14 and 16, which share data stored on direct access storage devices (DASDs) 18 and 20. DASDs 18 and 20 may include, for example, multi-disk drive assemblies. This is herein denominated "stable external storage". The architecture of sysplex 10 includes a plurality N of CPCs, S1–SN, each including one or more database management systems (DBMSs) exemplified by DBMS 21, which control the creation, organization and modification of one or more databases comprehending data in DASDs 18 and 20. Also provided in sysplex 10 is shared external store (SES) 22, which includes a high-speed nonvolatile electronic memory that functions as a cache shared by CPCs 12–16. SES 22 is coupled to CPCs 12–16 through high-speed optical links 25, 26 and 28, respectively.

Because SES 22 is a high-speed semiconductor memory, data may be retrieved and written to SES 22 by CPCs 12–16 much more rapidly than can be accomplished in DASDs 18–20, which are limited by the well-known rotating disk and linear actuator latencies. Moreover, coupling SES 22 through high-speed optical channels 25–28 provides very high-speed data transfer (e.g., 100 MB/sec). Thus, data pages may be written from CPC 12 over channel 25 to SES 22 in a few microseconds instead of the milliseconds required to transfer a data page between DASD 18 and CPC 12.

SES 22 includes a management logic 24 that may include a processor for managing all SES operations. Logic 24 may include, for example, a high-performance microprocessor with a local program store and private memory, rendering the management logic 24 capable of handling message-based memory access transactions with CPCs 12–16, which may comprise, for example, IBM/3090 systems, each including a multi-processor architecture with a private cache and each capable of supporting a database management system of the IMS/VS or DB2 type known in the art. Management logic 24 operates so that writing a changed page can cause cross-invalidate messages to be sent over high-speed links 25–28 to other CPCs wherein other DBMSs have cached the same data page. Such cross-invalidation is necessary to maintain data coherency among different DBMS instances, as fully disclosed in the above-incorporated references.

As FIG. 1 shows, SES 22 is not attached directly to any secondary storage device. In this regard, the DBMS of each CPC 12–16 is responsible for the contents of SES 22, operating by continuous transfer and registration of local cache data pages (not shown). The detailed operation and architecture of sysplex 10 can be understood with reference to the above-incorporated references.

The Invention

Figure 2:
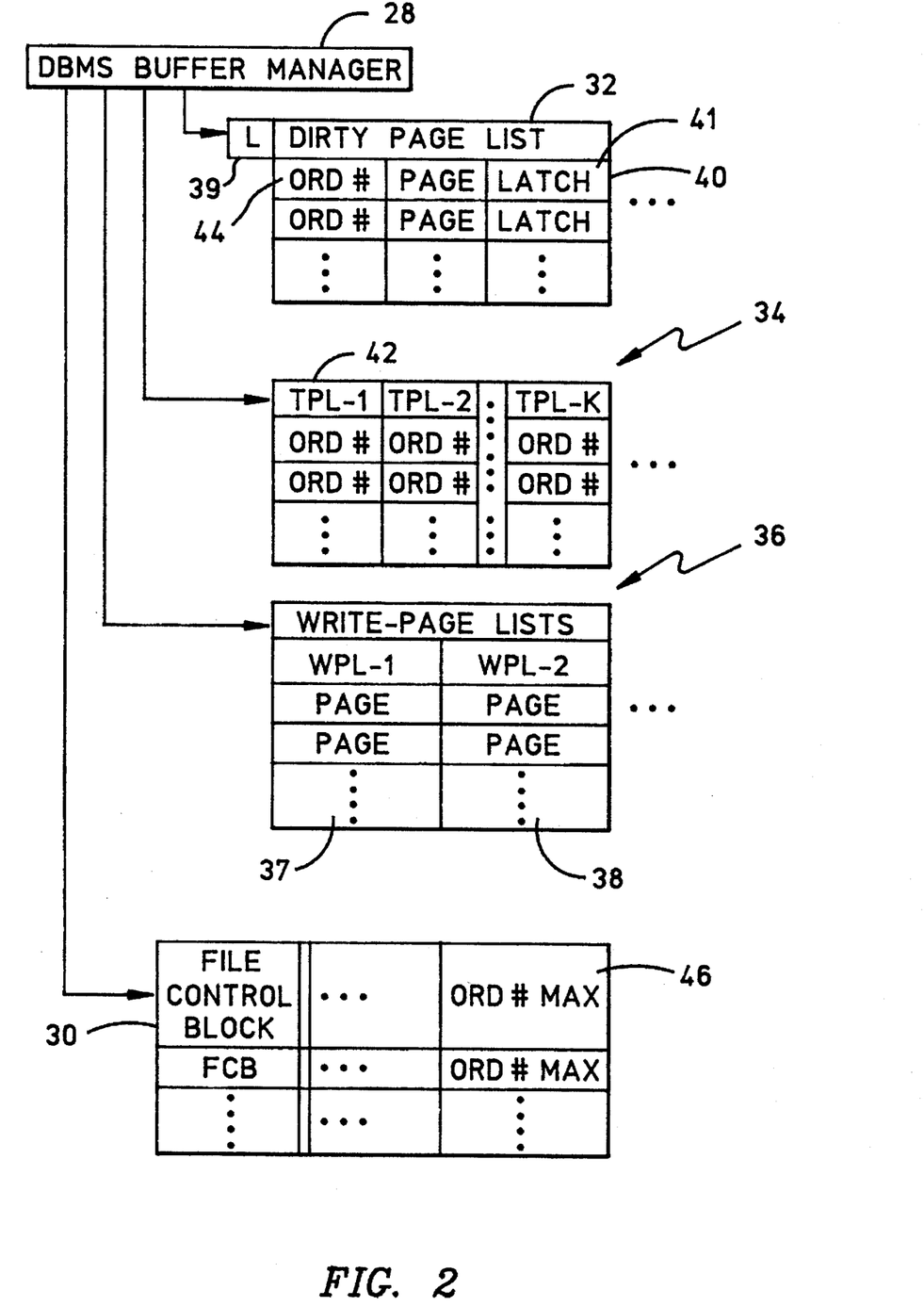
FIG. 2 is a functional block diagram showing data structures of this invention.

FIG. 2 shows the important data elements necessary for the practice of this invention. Each CPC shown in FIG. 1 includes a database management system (DBMS) exemplified by DBMS 21. DBMS 21 includes a local cache (LC) having a plurality of LC buffers (LCBs), exemplified by LCB 27, and a buffer manager (BM) 28, shown in FIG. 2. Buffer manager 28 includes a physical (P) locking procedure, described in the above-cited Josten et al. reference, that enables BM 28 to negotiate the upgrading or downgrading of a lock held on a cached data page within Local Cache Buffer (LCB) 27 allocated to DBMS 21 within CPC 12. In LCB 27 allocated to DBMS 21, BM 28 has access to a file control block (FCB) for every database that has been opened by DBMS 21. Each FCB, exemplified by FCB 30, is associated with several data page lists within LCB 27 in FIG. 1. For instance, FCB 30 is associated with the dirty page list (DPL) 32, a plurality of transaction page lists (TPLs) 34 and a plurality of write-page lists (WPLs) 36. Only one TPL and one WPL are required for each transaction in a "force-to-disk" environment.

The write-page list plurality 36 includes list 37 (WPL-1) and list 38 (WPL-2), which are combined if necessary during TPL processing to "externalize" data pages to SES. File control block 30 contains control information, flags and the data structures necessary to implement local maintenance and management of the associated database and to coordinate the maintenance and management with local control of the same database at other DBMSs in CPCs 14–16. Details of FCB 30 can be appreciated with reference to the above-incorporated references.

DPL 32 is a conventional listing of the BCBs for data pages held in LCB 27 (FIG. 1) that have been updated but not yet written to external storage. DPL 32 is latched by latch 39 and each data page BCB entry, exemplified by DPL entry 40, is also latchable by a page latch 41. DPL 32 is improved by the method of this invention to include an ordinal number (ORD#) in each BCB entry of the DPL, exemplified by ORD#44 in DPL entry 40. ORD#44 has a unique and ever-increasing value for each database within a single DBMS instance. The current maximum value of ORD# (ORD#MAX 46) is maintained within FCB 30 for the corresponding database. ORD#MAX 46 is incremented by one to obtain the next value assigned to a newly-dirty page in DPL 32. ORD#44 is assigned to a data page BCB in DPL 32 during the SetWrite processing under the exclusive-mode latching of DPL 32 when the data page state changes from clean to dirty. The original ORD#44 stored in the data page BCB in LCB 27 remains unchanged for subsequent updates to the cached data page until the page is written to stable storage. When the database has intersystem read/write interest, ORD#44 is also placed in TPLs 34 under the TPL corresponding to the particular transaction. This transaction may or may not be responsible for the triggering of state-change in the associated data page. As will become clear with reference to the discussion below in connection with transaction corresponding to TPL-1, and list 42 is maintained only until such transaction commits.

Perhaps the method of this invention can be best appreciated by first considering a procedure for updating a cached data page in a single-system environment where no "intersystem interest" is possible. In such an environment, for a DBMS such as DB2, a "no-force-at-commit" policy is implemented for modified pages in LCB. When the Data Manager (DM) component of the DBMS needs to update a data page, it first communicates with BM to issue a GETPAGE request providing the page-ID within the relevant database. BM then, if necessary, upstages the requested data page to the cache buffer pool. DM then issues a SETWRITE request to indicate intent to update the named data page. It is assumed that a page latch also is acquired in exclusive (X) mode as part of the SETWRITE processing. Table 1 provides a pseudo-code example of typical SETWRITE processing in BM for a single multiuser system.

TABLE 1

Setwrite Processing in Single System (prior art)

- Locate buffer-control-block (bcb) based on page-id
- Loop0:
  If bcb.io-in-progress = no
  - X latch dpl
  - If bcb.page-dirty = no /* page state is going from clean to dirty */
    - bcb.page-dirty = yes
    - Increment number of dirty pages for this file in File-Control-Block (fcb) by 1
      fcb.unclean-pages = fcb.unclean-pages + 1
    - add page at the bottom of the dpl /* LRU processing */
  - Else
    - maintain the LRU within dpl
  - Unlatch dpl
  - Else        /* bcb.io-in-progress = yes        */
    Loop1
    - put this transaction as waiter for I/O (via compare and swap logic)
    - wait for I/O to complete
    - Goto Loop0
- X Latch page
- If bcb.io-in-progress = yes /*io-in-process flag serialized by S page latch */
  - Unlatch page
  - Go to Loop1

Figure 3:
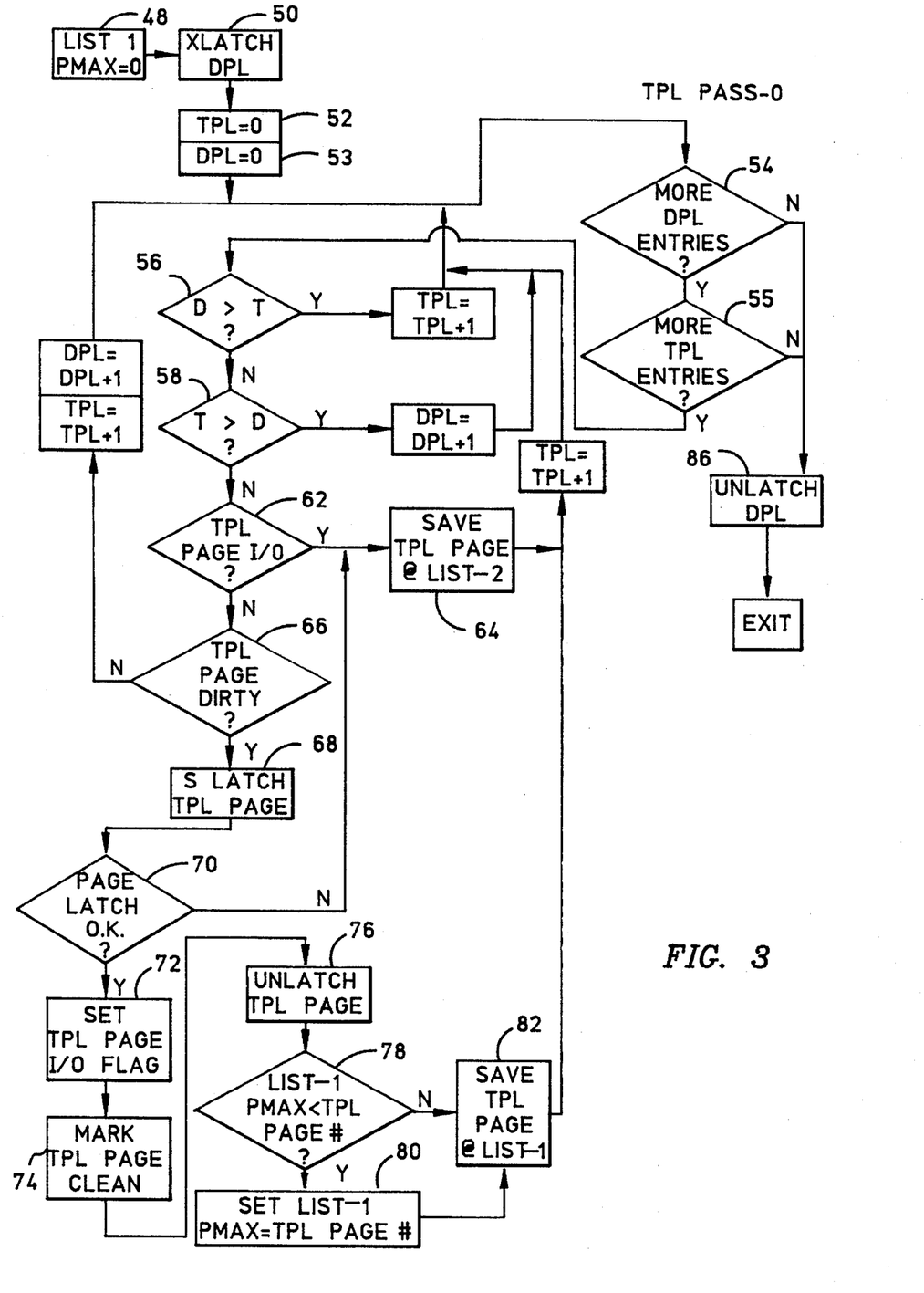
FIG. 3 is a functional block diagram of a flow chart illustrating the single pass transaction page list (TPL) sorting procedure of this invention.
Figure 4:
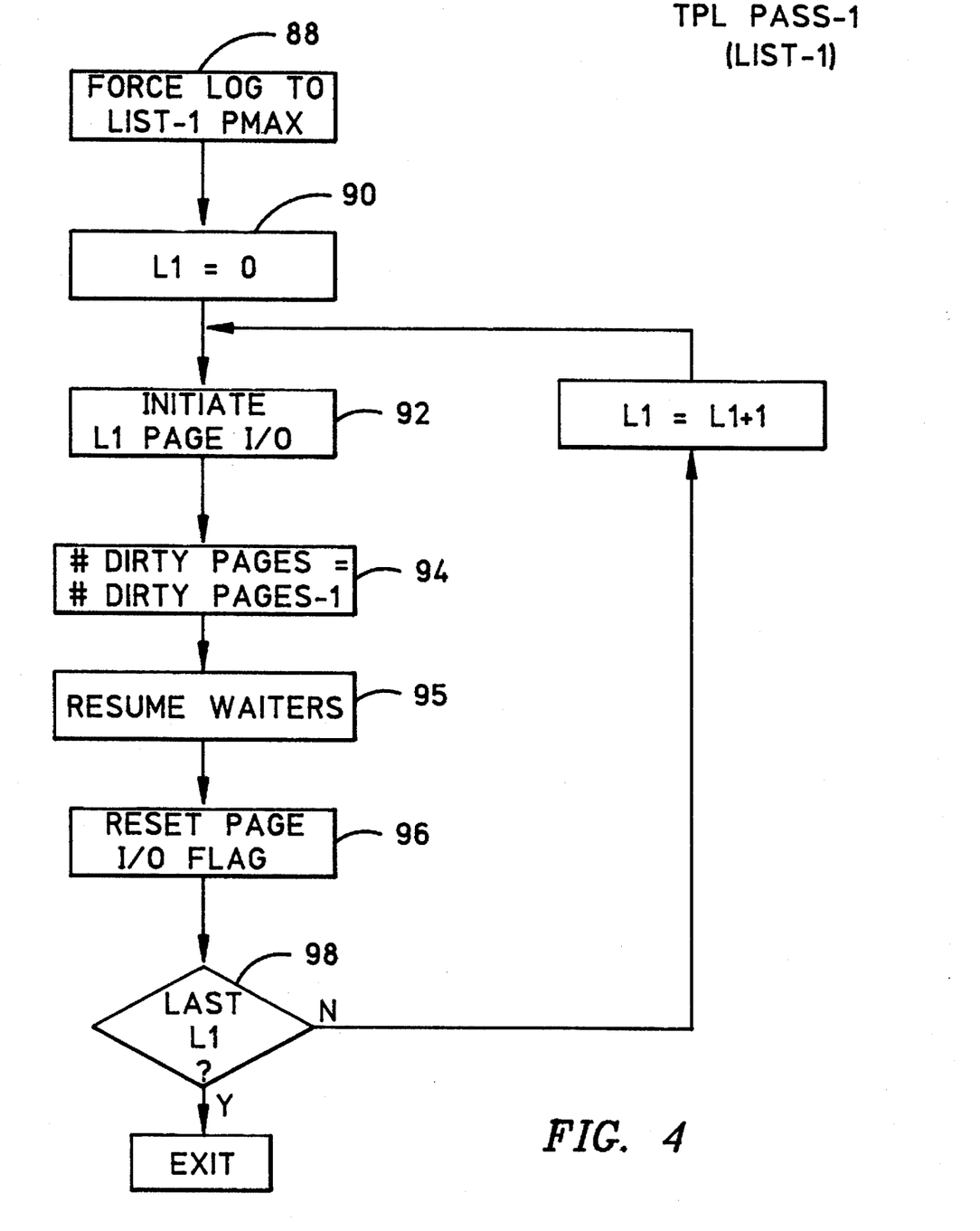
FIG. 4 is a functional block diagram of a flow chart illustrating the procedure for processing the immediate scheduled page list generated in FIG. 3.
Figure 5:
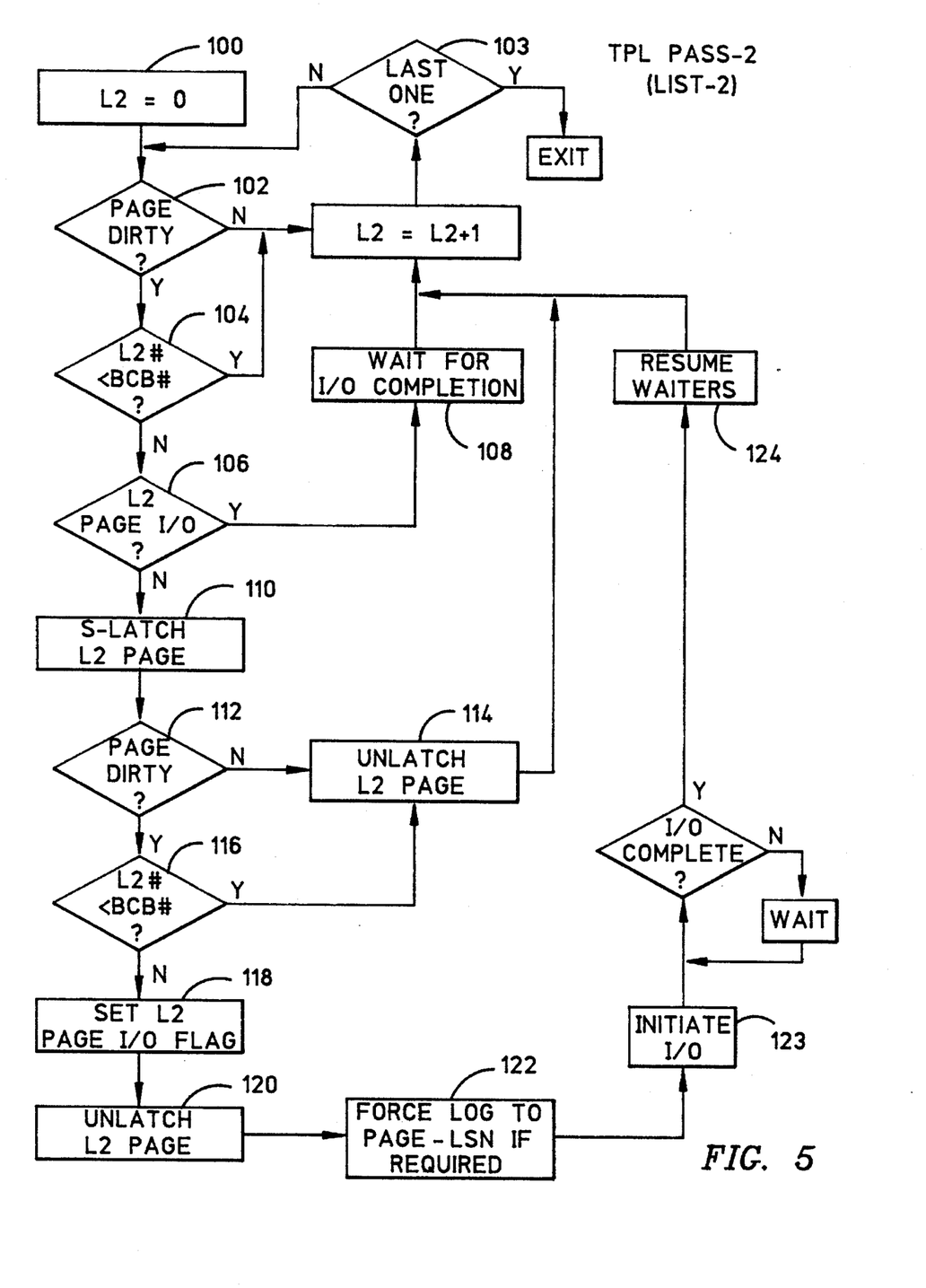
FIG. 5 is a functional block diagram of a flow chart illustrating the procedure for processing the deferred schedule page list generated in FIG. 3.

Table 3 and FIGS. 3–5, ORD#44 represents a dirty state of any data page within a database with respect to time. For example, if the same cached data page is updated at two different times separated by an intervening clean state, then the same data page is associated with two different ORD#s. Moreover, two different data pages must always possess different ORD#s.

WPLs 36 are generated by the procedure of this invention illustrated in Table 6 below to reduce the DPL serialization time and improve tolerance of transient interference from other transactions that may be updating the same data page targeted for externalizing by this transaction. TPLs 34 are introduced by this invention. They include a separate temporary ORD# list, exemplified by list 42 (TPL-1) for each transaction in DBMS 26. List 42 includes only a series of the ordinal numbers (ORD#s) from DPL 32 that are associated with data pages in LCB 27 that were accessed by the Note that BM maintains DPL for the pages that would be or have been updated for a database. DPL is used to support the "no-force-at-commit" policy in a single system environment by asynchronously (in batch mode) writing dirty pages to external storage, thereby amortizing the overhead costs of the associated write I/O. After BM updates the data page responsive to a transaction, DM unlatches the page with a Reset Write protocol. Note that the SetWrite processing shown in Table 1 maintains the DPL in least-recently used (LRU) order so that if a dirty page is again updated, it is placed at the bottom of the DPL.

For the "no-force-at-commit" policy, the asynchronous data page transfers to external storage are triggered by a thresholded test of the number of dirty pages in the DPL or in the buffer pool. Table 2 below provides a pseudo-code example of the processing of "batch" write I/Os in a single system.

TABLE 2

I/O scheduling in Single System (prior art)

- If fcb.unclean-pages = 0 then Exit /*No dirty pages for this file */
- S latch page
  - mark (bcb.i/o-in-progress = yes, bcb.page-dirty = no) via CS
  - fcb.unclean-pages = fcb.unclean-pages - 1
  - Unlatch page
- Dequeue page from dpl
  - X latch dpl
  - dequeue page from dpl and pass it to the I/O-process which would initiate I/O
    Note that multiple pages may be dequeued to amortize the cost of a disk I/O
  - Unlatch dpl
- Schedule I/O
  - Ensure that log has been forced up to the max(page-LSN's) of pages for which I/O would be initiated
  - Initiate I/O for a set of pages
- After I/O is complete, the back-end processing is as follows
  - Mark bcb.io-in-progress = no
  - Resume waiters Any subsequent update to the page will cause a page state to go from clean to dirty and the page will again appear in the dpl.

---

As described in the above-incorporated Josten et al. patent application, a DBMS operating in a multisystem shared disk environment (FIGS. 1–2) must follow a "force-at-commit" policy responsive to intersystem interest in the particular database so that it can use simple recovery techniques to recover that particular database in case of system failures. The "force-at-commit" policy is needed only for those databases for which there is intersystem read/write interest. Moreover, to avoid the delays introduced by disk I/Os and cross-invalidation message traffic, a DBMS such as DB2 uses SES 22 (FIG. 1) to perform the write I/Os efficiently.

The introduction of intersystem interest in a multisystem shared external store environment introduces new problems associated with the dynamic variation between "force" and "no-force" policies in a single DBMS. "Force-at-commit" policy requires tracking of updated pages for each transaction. Such a list is herein denominated a transaction-page-list (TPL), as exemplified by TPL 42 in FIG. 2. Because a transaction can update any number of data pages, an efficient technique is necessary for accomplishing such tracking. The method of this invention accomplishes this by including only ORD#44 in each TPL (FIG. 2).

It is possible that a data page found in the TPL of a committing transaction has already been written because of other activity against the buffer pool within the same DBMS, or because another system requests the same page to update some other record of the page before commit of the transaction associated with the TPL. Thus, to avoid wasteful externalizing of such pages, each TPL entry must be tested to determine whether the associated data page still exists in the buffer pool, whether it is still in a dirty state and whether a write-I/O is required for the particular committing transaction. A dirty data page in buffer pool always requires a write-I/O to external storage but such should not be triggered by the commit of a non-responsible transaction, for several reasons. First, externalizing data pages delays the commitment of the presently committing transaction. Also, the other transaction actually responsible for the dirty page state may continue to update the same page, negating all benefit from such officious I/O. Thus, an efficient detection technique is necessary for determining whether a particular data page must be externalized.

When a page must be externalized on behalf of a particular transaction, other transactions may introduce interference. For example, another transaction may be updating other records on the same page or may have already initiated write I/O of the same data page to external storage. The effect of such interference on efficiency must be minimized when each TPL is processed at commit of the associated transaction.

Finally, because DPL 32 is latched (latch 39) during each transaction commit processing in a "force-at-commit" procedure, DPL latch contention can reduce efficiency because of the increased DPL testing of data pages required in the multisystem shared external store environment. The method of this invention minimizes this problem by efficient searching of DPL for data pages that must be externalized.

The multisystem processing method of this invention is now described. As discussed above in connection with FIG. 2, this invention introduces the concept of an ordinal-number (ORD#) that has a unique and ever-increasing value per database within a DBMS instance. The current ORD# MAX is maintained in the FCB and is incremented by one to assign the next value to every newly-dirty page entry in DPL. ORD# is assigned to a data page during the SetWrite processing under a DPL latch in exclusive (X) mode whenever a cached data page state changes from clean to dirty. Table 3 below provides a pseudo-code example of the SETWRITE processing method of this invention.

TABLE 3

Setwrite Processing in Multisystem Shared Disk Environment

SetWrite Logic
- Locate buffer-control-block (bcb) based on page-id
- Loop0:

TABLE 3-continued
Setwrite Processing in Multisystem Shared Disk Environment

```
    If bcb.io-in-progress = no
•     X latch dpl
•     If bcb.dirty = no /*page state is going from clean to dirty */
        •   fcb.ord# = fcb.ord# + 1
        •   bcb.ord# = fcb.ord#
        •   bcb.page-dirty = yes
        •   fcb.unclean-pages = fcb.unclean-pages + 1
        •   queue bcb at the end of dpl
        •   if this is the first page on dpl
              •   fcb.lowest-ord# = bcb.ord#
    •   Else;   /* LRU is NOT maintained        */
    •   Unlatch dpl
•   Else        /* bcb.io-in-progress = yes      */
    Loop1
    •   put this transaction as waiter for I/O (via compare and swap logic)
    •   wait for I/O to complete
    •   Goto Loop0
•   X Latch page
•   If bcb.io-in-progress = yes /* io-in-process flag serialized by S page latch */
    •   Unlatch page
    •   Go to Loop1
```

The ORD# associated with a data page in LCB remains the same until the data page is written to stable storage. Because the ORD# is ever-increasing for the underlying database, each ORD# is used only once.

Efficient tracking of data pages in a data base that are modified by a transaction is provided by the transaction-page list (TPL) of this invention, each entry of which consists of the associated ORD# only. Before adding an entry to the TPL for a transaction, a simple test is made to detect a consecutive update to the same data page by comparing the ORD# of the last entry of the TPL with the ORD# of the new entry, which is available in the buffer-control block (BCB) for the data page copy in LCB. If the last TPL entry is not the same as the BCB entry for ORD#, the new entry is made at the end of the TPL. Consecutive duplicate TPL entries are thereby avoided, which reduces the TPL size without significant TPL search activity. Reducing the TPL size also reduces the TPL sorting time later in the procedure. Table 4 provides a pseudo-code example of the TPL processing for tracking ORD#s.

TABLE 4
Reset-Write Processing

```
Reset-Write or Page Unlatch
    /* Point to the last entry of tpl */
    If bcb.ord# = tple.ord# then; /* Consecutive updates to same page. Entry already
        exists. */
    else
        tplnum = tplnum + 1          /* Increment # of TPL entries */
        tpleptr = addr(tpllist(tplnum))       /* point to new entry at end */
        tple.ord# = bcb.ord#         /* save ord# in tpl */
```

For each database, the DPL is maintained in ORD# sequence, because of the method by which ORD#s are assigned to the cached data pages listed in DPL. This is an improvement in efficiency over the known technique for holding DPL entries in LRU order. It is more appropriate, with "force-at-commit" protocol, to list the DPL entries in "first-update-order" because the data pages are written responsive to transaction commit frequency instead of the usual thresholds of DPL length or dirty page population of the buffer pool. This improvement eliminates the activity normally required (including holding the DPL latch) for moving the page entries within the DPL to maintain LRU order.

The processing method of this invention associated with transaction commit is now described. This processing includes a "front-end" TPL procedure, exemplified by the pseudo-code listing in Table 5 below, followed by a three-pass process described below in connection with FIGS. 3–5 and Tables 6–8. The front-end processing in Table 5 merely sorts the TPL in ORD# order. Newly uncovered duplicate TPL entries are skipped during processing.

TABLE 5

Front-end processing for TPL

If fcb.unclean-pages=0
    then Exit /* No dirty pages for this file */
Sort of tpl by ascending ord#
If tple.ord# (of last-entry of tpl) < fcb.lowest.ord#
    then Exit
        /* All dirty pages for this transaction have been written */

The three-pass method of this invention includes (a) pass-0 to determine the set of data pages that must be processed by searching the DPL and making two lists herein denominated list-1 and list-2, (b) pass-1 to process list-1 and (c) pass-2 to process list-2.

TABLE 6

Pass-0 processing of TPL

```
Pass 0
    list 1.maxisn = 0 /* max of page-isn's of the pages for which this transaction
            marked io-in-progress */
    X latch dpl
    For every page in tpl
    .. if tple.page-ord# < bcb.ord#
    .... next tpl-entry      /* skip to this tpl-entry, page already written */
    .. else
    ... if tple.page-ord# >bcb.ord#       /* not interested in this page */
    ..... next bcb-entry on dpi
    ... else               /* ord# matches, check if need to write it */
    .... if bcb.io-in-prog = yes       /* io interference?      */
    ...... save @bcb and tple.ord# in list2 /* yes, save in list 2      */
    .... else
    ..... if bcb.page-dirty = yes
    ....... S latch page conditionally   /* don't want to wait for page latch   */
    ....... if page-latch obtained       /* update interference? no       */
    ......... mark bcb.io-in-prog = yes
    ......... mark bcb.page-dirty = no
    ......... Unlatch page
    ......... if list 1.maxlsn < page-lsn  /* must be done after marking io-in-prog */
    .......... list 1.maxlsn = page-lsn   /* since updates are not allowed to the page */
    ......... else;
    ......... save @bcb in list 1
    ....... else       /* did not get page latch, update interference */
    ......... save @bcb and tple.ord# in list2
    ..... else.         /* page is clean       */
    .... next bcb-entry on dpl
    .... next tpl entry
    End                      /* For Loop */
    Unlatch dpl
```

Pass-0 in FIG. 3 begins with step 48, which sets the list-1 MAX-LSN (log serial number) to 0. Step 50 latches DPL in exclusive mode and steps 52 and 53 respectively set TPL and DPL loop indices to zero. After testing for end of DPL & TPL in steps 54 and 55, respectively, steps 56 and 58 test the ORD# entry in DPL against the ORD# entry in TPL to determine which one exceeds the other. In step 56, if the DPL entry is greater, the TPL data page is skipped (by exiting the DPL loop, incrementing the TPL index and starting step 56 again) because it has already been written to external storage. If the TPL entry exceeds the DPL entry (step 58) the DPL entry is not relevant to the committing transaction, and the DPL index is incremented before returning to step 56.

If the TPL and DPL entries are identical, the IOP flag bit in the BCB of the data page in DPL is tested at step 62 to determine whether the data page is currently involved with I/O initiated by other interfering transactions. If so, this data page BCB and ORD# are saved to list-2 at step 64, the TPL index is incremented and the process returns to step 54. If The flow chart in FIG. 3 is an exemplary embodiment of the pass-0 procedure of this invention for generating list-1 and list-2. In pass-0, the set of data pages to be processed is identified under the DPL latch. For a given data page, if there is no interference by other transactions and no I/O in progress, then the I/O-in-progress (IOP) flag in the buffer control block (BCB) for that page is set to indicate I/O-in-progress and the page BCB is added to list-1. If there is interference of any type from other transactions, the page BCB with its associated ORD# are assigned to list-2. After pass-0, the DPL is immediately unlatched. Note that no write-I/Os are scheduled and no waits are performed for data pages assigned to either list during pass-0, thereby substantially reducing DPL latch-hold time. Table 6 provides a pseudo-code embodiment of the pass-0 method shown in FIG. 3.

there is no I/O in progress, step 66 tests the dirty page (DP) flag in the BCB to verify that the data page is indeed dirty (DPL entries are not always removed when "cleaned" by a write-I/O, perhaps remaining in DPL with the DP flag reset). If step 66 finds the matching DPL data page entry to be clean, the entry is ignored and both the DPL index and TPL index are incremented before returning to step 54.

If step 66 finds the data page to be dirty, step 68 obtains a latch thereon in share (S) mode. At step 70, if the S-latch is refused (presumably because of interfering activity by other transactions) the procedure assigns the data page to list-2 at step 64. If the data page S-latch is granted, step 72 then sets the IOP flag in the corresponding BCB to announce that the write-I/O is in process. Step 74 then immediately resets the DP flag in the BCB for the data page to mark it as "clean", before initiation of the write-I/O operation. After setting the IOP flag and resetting DP flag in the data page BCB, step 76 unlatches the page, thereby permitting full access by other transactions subject to the two BCB flags.

Step 78 tests the max page-LSN of all data pages entered in list-1 so far (PMAX) at step 78, setting it at step 80 if the data page LSN exceeds the existing PMAX value. In either event, step 82 saves the data page to list-1 and returns to step 54. When steps 54 and 55 show the exhaustion of either the TPL or DPL, the DPL is unlatched at step 86, completing the pass-0 procedure.

Essentially, pass-0 is a merge-scan search because both TPL and DPL are ordered by ORD# and only those data pages that intersect the lists are considered for processing. Given an ORD# in the sorted TPL, the DPL is scanned for an ORD# that is equal to or greater than the ORD# from TPL. If an equal DPL entry is encountered, and the associated DP flag or IOP flag in the BCB for the DPL data page entry is set, further processing is required. If a higher ORD# is encountered in DPL, the scan for this TPL entry halts (it will not be found in the remainder of the sorted DPL) and the next TPL entry is examined by continuing the DPL scan from that position. This very efficient search procedure of this invention reduces DPL latch contention, thereby improving overall system performance.

After list-1 and list-2 are generated by the pass-0 process, list-1 is then immediately processed in a pass-1 procedure shown in FIG. 4. Because write-I/Os to SES 22 (FIG. 1) are not likely to incur I/O waits (SES is a high-speed stable electronic store), and because list-1 contains only data pages for which no interfering process exists, pass-1 proceeds rapidly through list-1, limited only by log-forces if required and by SES electronic speed. Thus, delaying list-2 processing until completion of pass-1 optimizes overall write-I/O speed for the data pages associated with the committing transaction. Table 7 provides a pseudo-code example of the pass-1 processing of list-1, which is also embodied in the flow chart of FIG. 4.

TABLE 7-continued

Pass-1 processing of TPL

```
      bcb.io-in-progress = no       /* io complete */
   End
```
Note that page is left on the dpl even though it clean. Such a page, if remains clean until next checkpoint, would be dequeued from dpl. fcb.lowest-ord# is maintained in that processing.

FIG. 4 begins with step 88, which forces the recovery log to stable storage up to the maximum page-LSN maintained in list-1. Step 88 is necessary because of the WAL database recovery protocol. Step 90 sets the list-1 index to zero, beginning the processing loop. Within the loop, step 92 initiates the write-I/O for the list-1 entry and waits for completion. Step 94 decrements the dirty page count in the FCB for the database, step 95 resumes any waiters who may be waiting for page-I/O completion and step 96 resets the IOP flag in the BCB for the data page (set in step 72 of FIG. 3). Finally, step 98 tests for list-1 exhaustion and, if not exhausted, the list-1 index is incremented and control proceeds to step 92 substantially as shown.

FIG. 5 shows a flow chart exemplifying the pass-2 procedure of this invention for processing the data page entries on list-2. By delaying pass-0 until completion of pass-1, the resulting elapsed time may outlast many of the interfering activities that initially forced the data pages to list-2 in pass-0. If the interference can arise from a concurrent updating transaction, the procedure obtains a share-mode (S) latch on the data page to determine if the page is clean or if the associated ORD# in the data page BCB has become greater than the ORD# in list-2. If not, the IOP flag in BCB is set and the write-I/O is scheduled. Table 8 provides a pseudo-code embodiment of the pass-2 procedure of this invention shown in FIG. 5.

TABLE 8

Pass-2 processing of TPL

```
Pass 2
   For each page in list2
      if (bcb.page-dirty = no) OR (list2.ord# < bcb.ord#)  /* page already written */
         then;
      else
         if bcb.io-in-progress = yes
            wait for io
         else     /* this entry must be because page latch could not be obtained */
            S latch page unconditionally
            if (bcb.page-dirty = no) OR (list2.ord# < bcb.ord#)
               then Unlatch page
            else
               bcb.io-in-progress = yes
               Unlatch page
               Force log upto page-lsn if required /* system wide lsn may indicate
                                   /* that force is not required        */
               wait for io
      Iterate
   End
```

TABLE 7

Pass-1 processing of TPL

```
Pass 1
   Force log to list 1.maxlsn
   For each page in list 1
      initiate io
      fcb.unclean-pages = fcb.unclean-pages - 1
      bcb.waiter q = 0 and resume waiters
```

In FIG. 5, the loop begins at step 100, which sets the list-2 index to zero. Step 102 verifies the status of the DP flag in the buffer-control block (BCB) for the local-cache buffer (LCB) copy of the data page in list-2. If the page is no longer dirty, the list-2 entry is ignored, the list-2 index is incremented and the process returns to step 103 to test list exhaustion and, if more entries remain, therefrom to the top of the loop substantially as shown. If the page is dirty, step 104 compares the ORD# entry in the data page BCB with the ORD# entry in list-2 to ensure that the list-2 ORD# entry remains valid. A list-2 ORD# entry that is less than the BCB ORD# value shows that the previous data page entry in list-2 has already been written to stable storage and may be ignored.

After validating the list-2 entry in steps 102–104, the IOP flag in the respective BCB is tested at step 106 to determine if the page write-I/O activity is already in progress through a foreign transaction. If it is, step 108 waits for completion of that I/O by the foreign transaction, which "resumes" this transaction after step 108 completes. Then the list-2 index is incremented to proceed to the next entry in list-2. If step 106 fails, a page latch is requested in share (S) mode at step 110. Once latched, step 112 tests the DP flag in the page BCB. If the page is clean, step 116 unlatches the page and proceeds to the next list-2 entry by incrementing the list-2 index. If step 112 shows the page is still dirty, then the ORD# entry in the data page BCB is once again compared with the ORD# in list-2 at step 116. A more recent BCB ORD# value exceeding that in list-2 shows that the previous list-2 data page has already been forced to disk and the procedure bypasses the list-2 entry by proceeding to step 114 discussed above.

After verifying the list-2 entry qualification for externalization in steps 112 and 116, step 118 sets the IOP flag in the BCB for the data page to announce the pending write-I/O operation and unlatches the page at step 120. Only after this careful verification procedure is the recovery log forced up to the data page LSN at step 122, preparatory for forcing the data page to stable storage at step 123. Of course, step 123 is rapidly accomplished by writing to SES 22, after which waiters are "resumed" at step 124, the list-2 index is incremented and control returns to step 103 substantially as shown.

Note that the data pages are not dequeued from the DPL before or after being written to stable storage. This means that a clean page may remain in the DPL, thereby permitting other transactions to detect the data page when it has a IOP flag set (I/O in progress) as other committing transactions proceed with their own TPL processing. This feature distinguishes the procedure of this invention over the write-I/O scheduling procedures known in the art for single systems, wherein pages are dequeued from DPL just before being written to stable storage. The clean pages remaining in DPL according to this invention may be dequeued during asynchronous write-I/Os that are performed because of checkpoint generation or responsive to DPL-length thresholds, if desired.

Note that DPL latch contention is reduced by the efficient DPL search used in this invention to determine whether a page needs to be externalized. This search also has consequences for pages that are not found in DPL or are found there but do not match the TPL ORD# entry. For example, if a page is not found in DPL, the method of this invention may presume that it has already been written to stable storage and no action is required by the committing transaction. If a page is found in DPL but its ORD# is greater than the one in the TPL, the method of this invention ensures that this page is not a candidate for write-I/O for the current committing transaction because it was subsequently dirtied by another concurrent transaction. In a multiuser multisystem environment, processing efficiency considerations require each committing transaction to avoid writing data pages to stable storage officiously on behalf of other concurrent transactions, an important consideration that is satisfied by the method of this invention.

Within a DBMS instance in a multiuser environment, when a committing transaction attempts to schedule a write-I/O for a data page, delays caused by other transaction interference in the same page can reduce committing transaction efficiency. The method of this invention ensures that the committing transaction schedules write-I/Os for all TPL entries efficiently, forcing to high-speed external storage those pages for which no interference exists before returning to the delayed data pages in list-2 for disposition. Also, the DPL latch is not held during the actual write-I/O to SES nor is it held during waiting required by interfering transaction activity. Thus, the procedure of this invention minimizes overhead associated with commit processing by transactions, thereby minimizing the effect of database store sharing among multiple systems in a processor cluster.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. A machine-implemented method for maintaining recoverable database coherency in a data processing system, comprising the steps of:

(a) structuring said data processing system to include one or more Central Processing Complexes (CPCs), in which each said CPC has one or more processes, a plurality of direct access storage devices (DASDs) coupled to said CPCs for permanent stable storage of one or more databases, each database having a recovery log, and a shared electronic store (SES) for temporary nonvolatile data storage;

(b) coupling said SES to one or more local caches (LCs) provided in the main data stores of said CPCs, each said LC containing one or more LC buffers (LCBs), each LCB for storing data pages for processing by transactions;

(c) maintaining for each said LCB a dirty page list (DPL) of data pages stored in said each LCB that have been modified by a transaction of said transactions but not written to SES or to said DASDs, said DPL including a unique ordinal number (ORD#) for each said data page listed in said DPL; and (d) maintaining for each transaction of said transactions a Transaction Page List (TPL), said TPL including ORD#s for data pages modified by said each transaction.

2. The method of claim 1 comprising the additional step of:

(e) responsive to commitment of a first transaction of said transactions, partitioning data pages modified by said first transaction into a first processing list and a second processing list, said first processing list including unlatched data pages modified by said first transaction and having ORD#s in a TPL for said first transaction and in at least one DPL, and said second processing list including latched data pages having ORD#s in said TPL for said first transaction and in at least one DPL.

3. The method of claim 2 comprising the additional steps of:

(f) forcing to stable storage all recovery log entries preceding the latest data page modification represented in said first processing list; and (g) scheduling data pages represented by said recovery log entries for transfer to stable storage.

4. The method of claim 3 comprising the additional steps of:

(h) for a data page in said second processing list, responsive to release of a latch on said data page, performing the steps of:

(h.1) checking the dirty status of said data page, and (h.2) responsive to confirmation of a dirty state, scheduling said data page for transfer to stable storage.

5. The method of claim 2 comprising the additional steps of:

(f) for a data page in said second processing list, responsive to release of a latch on said data page, performing the steps of:

(f.1) checking the dirty status of said data page, and (f.2) responsive to confirmation of a dirty state, scheduling said data page for transfer to stable storage.

6. In a processing system having a plurality of database management systems (DBMSs), each DBMS having a local cache buffer (LCB) for storing data pages for processing by transactions, said DBMSs being coupled to a nonvolatile External Storage System (ESS) including a shared electronic store (SES) and an external data store for stable storage of one or more databases, each said database having a recovery log, each data page in an LCB having a page state that becomes dirty upon modification of said each data page by a transaction and becomes clean upon copying of said each data page to said ESS, a method for scheduling data pages in each said LCB for writing to said ESS to maintain recoverable database coherency, said method comprising the steps of:

(a) assigning within said each database a unique ordinal number (ORD#) to each data page of the database in an LCB responsive to a change of the page state of said data page from clean to dirty;

(b) maintaining for said each database a dirty page list (DPL) that includes an ORD# for each data page in an LCB having a dirty state; and (c) maintaining for each transaction $T_1$ of said transactions a transaction page list ($TPL_i$) that includes an ORD# for each data page in an LCB that was modified by said each transaction $T_i$.

7. The method of claim 6 additionally comprising the step of:

(d) responsive to the commitment of a first transaction $T_j$, scheduling for writing to said ESS data pages having ORD#s listed in a DPL whose ORD#s are also listed in 1 $TPL_j$ for said first transaction T.

8. The method of claim 7 wherein said scheduling step (d) comprises the steps of:

(d.1) comparing each ORD# in said $TPL_j$ for said first transaction $T_j$ with ORD#s in said DPL;

(d.2) assigning each data page having an ORD# in said DPL that matches an ORD# in said $TPL_j$ to one of two processing lists; and (d.3) scheduling data pages assigned to a first processing list of the two processing lists for writing to said ESS.

9. The method of claim 8, wherein:

step (d.2) includes assigning said each data page to a second processing list of the two processing lists if said each data page is latched by an existing process, otherwise assigning said each data page to said first processing list unless said each data page is not dirty;

the method further including the steps of:

(d.4) scheduling data pages assigned to said second processing list to await completion of said writing of said data pages assigned to said first processing list before being written to said ESS;

(d.5) forcing to said recovery log transaction log entries preceding the latest modification of a data page in said first processing list.

10. The method of claim 9 wherein:

step (d.4) includes, responsive to completion of writing of said data pages assigned to said first processing list, scheduling for writing to said ESS each data page listed in said second processing list unless said each data page is not dirty.

11. The method of claim 7 wherein:

said scheduling step (d) includes sorting ORD#s in said $TPL_j$ by numerical order.

12. The method of claim 7 wherein said scheduling step (d) comprises the steps of:

(d.1 ) comparing each ORD# in said $TPL_j$ for said first transaction $T_j$ with ORD#s in said DPL;

(d.2) assigning each data page having an ORD# in said DPL that matches an ORD# in said $TPL_j$ to one of two processing lists;

(d.3) scheduling data pages assigned to a first processing list of the two processing lists for writing to said ESS; and (d.4) scheduling data pages assigned to a second processing list of the two processing lists to await completion of said writing of said data pages assigned to said first processing list before being written to said ESS.

* * * * *